United States Patent [19]

Mulvany et al.

[11] 3,839,920

[45] Oct. 8, 1974

[54] DRIVE COUPLING APPARATUS

[75] Inventors: Richard Burke Mulvany; Albert Daniel Rizzi; John Harold Wright, all of San Jose, Calif.

[73] Assignee: International Business Machines Corporation, Armonk, N.Y.

[22] Filed: Mar. 8, 1973

[21] Appl. No.: 339,267

[52] U.S. Cl. .................. 74/242.14 R, 74/242.15 R

[51] Int. Cl. .............................................. F16h 7/10

[58] Field of Search ........... 74/242.15 R, 242.14 R, 74/242.1 R

[56] References Cited

UNITED STATES PATENTS

| | | | |
|---|---|---|---|
| 1,994,586 | 3/1935 | Mihalyi | 88/17 |
| 3,008,012 | 11/1961 | Proctor | 179/100.2 |
| 3,600,070 | 8/1971 | Downey | 352/72 |
| 3,623,417 | 11/1971 | Eloranta et al. | 95/89 R |

FOREIGN PATENTS OR APPLICATIONS

| | | |
|---|---|---|
| 1,247,108 | 8/1967 | Germany |

*Primary Examiner*—Leonard H. Gerin
*Attorney, Agent, or Firm*—Nathan N. Kallman

[57] ABSTRACT

An apparatus for coupling a drive assembly to a driven element employs pivotable roller arms, which are engaged during a non-operating mode with a drive belt that is coupled to a drive motor; and which are disengaged during a loading mode from the drive belt, when a pulley associated with the driven element is engaged with the drive belt. During loading, the belt is made taut about the drive motor pulley and the driven element pulley by use of a movable camming plate.

10 Claims, 4 Drawing Figures

DRIVE COUPLING APPARATUS

CROSS REFERENCE TO RELATED APPLICATION

In U.S. Pat. 3,786,454 entitled "Magnetic Disk Storage Apparatus," assigned to the same assignee there is described a disk storage module and disk file housing which are adapted to employ the invention disclosed and claimed herein. The referenced patent teaches a removable, interchangeable disk module including a disk drive spindle and movable accessing heads, among other things.

BACKGROUND OF THE INVENTION

1. Field of the Invention

This invention relates to a novel drive coupling apparatus, and in particular to an improved means for belt coupling a drive shaft of a module to a drive motor contained in a housing.

2. Description of the Prior Art

Although the invention is disclosed in the environment of a disk file apparatus for purpose of explanation and illustration of use, it should be understood that the invention is not limited thereto.

In prior known disk file storage systems, interchangeable and removable disk packs are employed with disk file housings. The file housing generally includes a drive motor with a spindle attachment, to which a disk pack is seated and locked to enable rotation of the disks during data processing. As disk file technology progresses, in order to obtain higher storage density, more data tracks are registered along the radial direction of a disk surface. This increase in tracks-per-inch packing density imposes more critical tolerances on the relationship between the data heads and data surfaces and necessitates proper coupling between the drive motor shaft and disk mounting hub.

With the novel approach disclosed in the aforementioned U.S. Pat. No. 3,786,454, the disk hub and drive spindle are both part of a disk module, and are connected so that they maintain a fixed precise relationship to each other. The cited patent also describes a sealed disk module having an exposed spindle and pulley, which when rotated by a drive belt coupled to a drive motor pulley, causes the magnetic disks to rotate within the module.

The module provides a recess surrounded by a wall, having one portion open or broken away for protecting the disk spindle and pulley. In such case, provision must be made to engage or disengage the disk pulley with the drive belt that is maintained in constant engagement with the drive motor pulley. Furthermore, the drive coupling must be effectuated relatively rapidly with ease, and yet in such manner that the belt coupling is taut and not subject to slippage during operation of the module and file.

SUMMARY OF THE INVENTION

An object of this invention is to provide a novel and improved drive coupling apparatus.

Another object of this invention is to provide a drive coupling apparatus that facilitates loading and unloading of a data storage module.

Another object is to provide a drive coupling apparatus that self-adjusts for variations in drive belt length.

A further object is to provide a coupling apparatus that maintains stable speeds for the driven element.

A still further object is to provide a drive coupling apparatus that does not require idlers in the power drive loop, and allows compactness of structure.

Another object is to provide a coupling apparatus that can handle high transmission torques for rapid start and stop.

Another object is to provide a coupling apparatus having approximately 180° of wrap for each of two coupled pulleys, without the use of idlers.

Another object is to provide a coupling means for loading and unloading a module to a drive pulley and belt, and after unloading the module, to maintain the drive pulley and belt in readiness for insertion of another like module.

In accordance with one embodiment of this invention, an apparatus for coupling a disk module spindle and pulley to a motor drive shaft and pulley of a disk file housing, includes a drive belt that is retained in a loop by means of pivotable retainer arms and the drive pulley. During loading, the module pulley is placed within the perimeter of the belt and moved against the belt, thereby causing the synchronously geared retainer arms and rollers supported at the ends of the arms to be pivoted and moved along the belt towards the motor pulley. A movable plate, having a cam surface for urging the retainer arms out of contact with the belt during loading, supports a load spring that causes tensing of the drive belt, so that suitable torque is transmitted from the drive motor to the disk spindle. As a result, a drive coupling apparatus is provided which is simplified and reduced in cost, and which is not tolerance sensitive.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figures 1, 3:
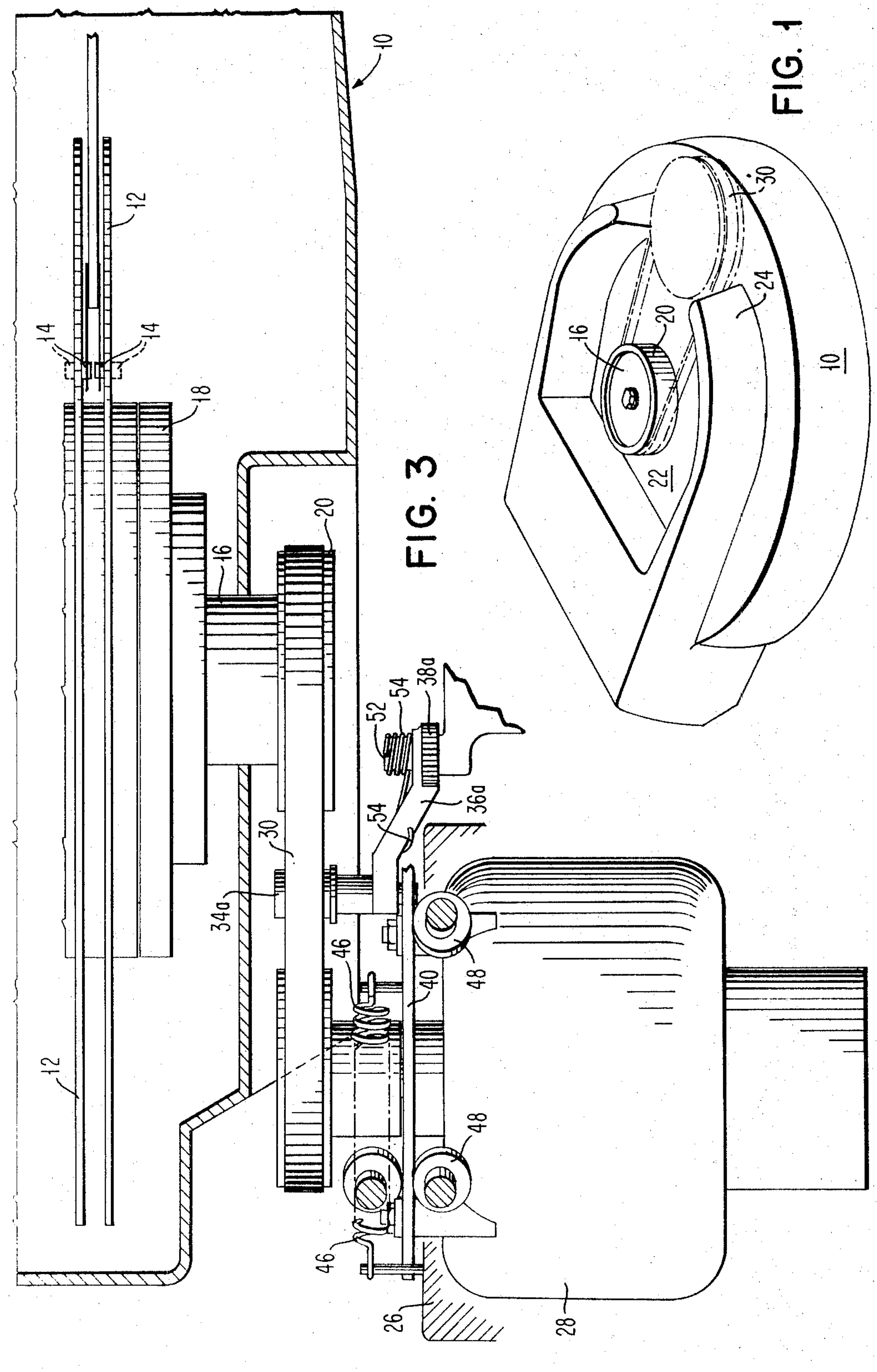
FIG. 1 is a plan view of the bottom of a storage module having an external spindle and pulley, and a drive belt and drive pulley of a file housing shown in phantom, such as may be used with the invention.
FIG. 3 is a side elevational view of the module and file housing when joined for operation.

With reference to FIGS. 1 and 3, a storage module 10 includes one or more storage disks 12 that are rotated for signal transducing by accessing magnetic heads 14. A shaft or spindle 16 is attached to a rotary hub 18, to which the disks are mounted. The spindle 16 extends through the sealed module 10, and has a pulley 20 at its end. The disk spindle 16 and pulley 20 are protected within a recess 22, configured into the module design. A projecting portion or wall 24 surrounds the recess 22, and is broken at one portion to enable engagement of the disk spindle pulley 20 with a drive belt 30.

Figure 4:
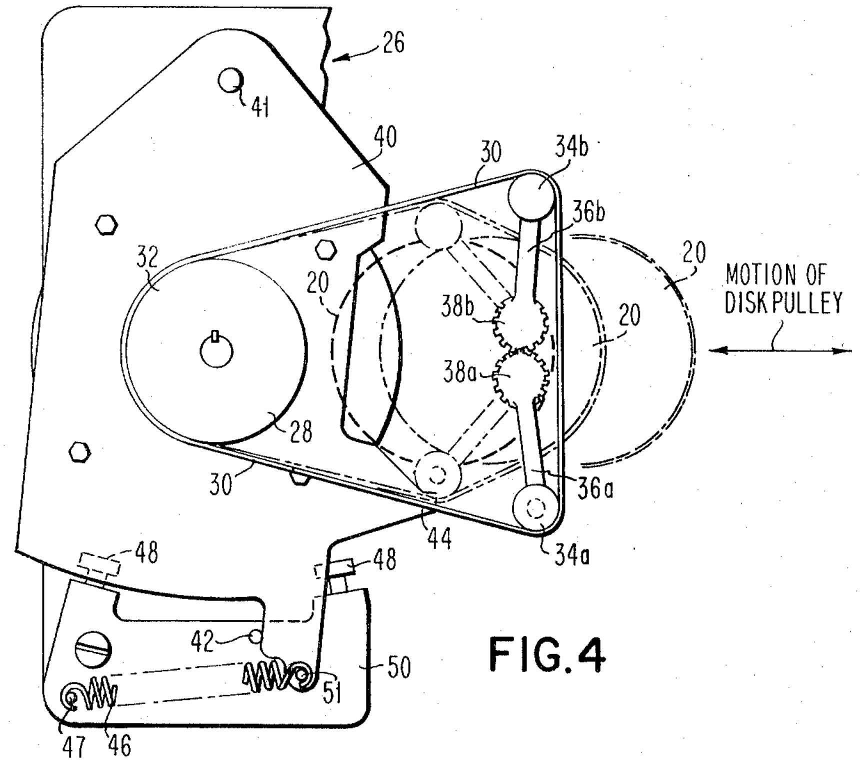
FIG. 4 illustrates the unloaded and intermediate loaded conditions of the belt coupling apparatus, in accordance with this invention.

To accept the module disk pulley 10 for driven engagement, a file housing 26 has a drive motor 28, and attached drive pulley 32 coupled to the drive belt 30. In the unloaded condition, as shown in FIG. 4, in the absence of a module, the belt 30 is maintained in a triangular-type loop by means of spring-loaded rollers 34*a, b* disposed at the ends of pivotable arms 36*a, b* in conjunction with the drive pulley 32. The arms are connected through gears 38*a, b* to provide synchronous pivotal motion in opposing directions.

To load the module 10 to the file housing 26, the module is seated and registered in proper position by alignment and registration means, as described in the aforementioned U.S. Pat. No. 3,786,454. At first, the module disk spindle 16 and pulley 20 is placed by the operator within the perimeter of the drive belt 30 in a given orientation. The module is moved forward (which is to the right in FIG. 4) by an operator, or preferably by automatic means.

Once the module 10 is positioned so that the disk spindle 16 is located within the triangular shaped belt 30, a load mechanism, such as described in the above-cited patent, moves and guides the module 10 and the disk spindle pulley 20 away from the drive motor pulley 32. The disk pulley 20 engages the drive belt 30, as illustrated in FIG. 4, and the continuing motion of the module 10 and disk spindle pulley 20 in response to the load mechanism produces forces on the belt, with a resultant vector force that passes through the arm roller 34. The application of this force causes a rotation of the roller arms 36 about the gear pivot points, inwardly from the belt 30 and toward the motor pulley 32. While the roller arms 36 are being pivoted, a load spring 54 attached to one of the roller arms 36*a* at one end, and wrapped and attached at its other end to a post 52 located at the center of the associated gear 38*a* (see FIG. 3), is rotated into a condition of torsion. The roller arms 36 are retained in loaded position by an edge surface of the motor plate 40 adjacent to a camming surface 44.

Figure 2:
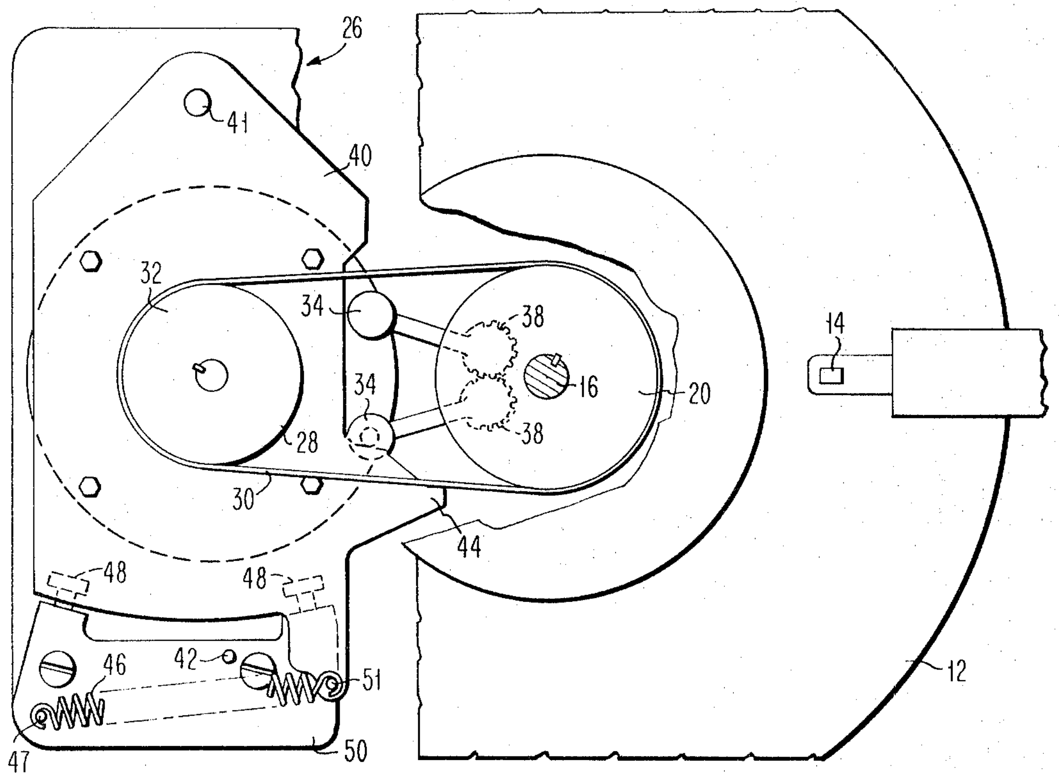
FIG. 2 is a top plan view of a file housing that is configured to accommodate the module, parts of which are shown.

As the disk pulley continues to move and tense the drive belt 30, the motor plate 40 is moved around a pivot point by virtue of the increasing belt tension. The motor plate 40 rotates about the pivot point, which is established by a hinge pin 41 fastened to the housing frame 26 and attached to the plate. The rotational force of the motor plate overcomes the tension force of a load spring 46, that is fixed at one end to a reference point 47 located on a stationary motor support assembly 50 of the housing, and which is fastened at its other end to a pin 51 attached to the motor plate 40. When pivoted, the motor plate is moved along rollers 48 which serve to reduce frictional effects. As the motor plate moves, the cam surface 44 of the plate forces the roller 34a and the arm 36a inwardly toward the centerline delineated by the path between the centers of the two pulleys 20 and 32, as shown in the loaded position in FIG. 2. The cam surface 44 formed at an edge of the plate 40 contacts only one of the arm rollers 34*a* causing both synchronously geared roller arms 36 to move out of contact with the belt 30. The floating motor plate 40 and motor pulley 32 move to tense the belt 30 at one end, while the disk pulley 32 reaches the limit of its travel at the other end of the belt 30, when the module 10 is locked in position relative to an external actuator, as described in the previously mentioned patent. The non-contact condition between the belt 30 and rollers 34, that is established during loading and operation of the module in the file housing, ensures that the arm rollers 34 will not drag on the drive belt 30 during drive operation, when the motor 28 is running.

In effect, the steps of coupling the interchangeable data module with the file housing consist of first placing the disk spindle and pulley within the perimeter of the belt, then moving the disk pulley to tension the belt against the roller arms, thereby forcing the pivotable arms to move away from the belt, and then causing a motor plate which is spring loaded to move to provide final tensioning of the belt, at which point the drive pulley and driven disk pulley are in intimate coupling with the belt or drive relation.

After having accomplished data transfer with the interchangeable module 10 coupled to the housing 26, the module is removed from the housing by moving the module and its disk pulley back in the direction toward the motor pulley 32. With an unloading force applied, the motor plate load spring 46 is relieved, and it forces the motor plate 40 to rotate in a direction that will bring it to a position against the stop pin 42. This motion allows the geared roller arms 36 to rotate outwardly into contact with the belt 30, in response to the roller load spring 54 coupled to the arm 36*a*. The continuing motion of the disk pulley toward the drive motor 28 and pulley 32 allows the arms 36 to continue pivoting until they make contact with the belt. The arms 36 take up any slack that exists in the belt, when the disk pulley has been moved to the insertion position and out of contact with the drive belt. At such time, the arm rollers 34 have engaged the belt so that the triangular shaped configuration is formed. When the module is removed, the drive arrangement of belt, motor pulley, motor plate and pivotable retainer arms is ready to accommodate another similar module having the same interfaces.

It is significant that the size of the triangle formed by the belt, the lengths of the pivotable arms 36 as defined by the distance between the pivot points of the gears 38 to the center of the arm rollers 34, and the distance between the pivot points of the two arms, have a geometric relationship that ensures pivoting of the arm in the proper direction during loading and unloading with proper clearance of the rollers relative to the moving disk pulley.

The drive coupling assembly disclosed herein selfadjusts for variations in belt lengths and belt stretch, and is not tolerance sensitive. The geometric configuration allows reduction in space of a storage module and file housing, and therefore achieves a desired goal of compactness.

It should be understood that the scope of the invention is not limited to the particular arrangement and the specific elements disclosed above. For example, bearings or low friction elements, such as Teflon, may be used in lieu of the arm rollers. Also, the camming surface that is used for urging the rollers and arms away from the belt need not be formed with the floating motor plate, but may be part of another movable plate or element to accomplish the same purpose.

What is claimed is:

1. A drive coupling assembly comprising:

a drive belt;

a drive motor pulley coupled to said drive belt;

retainer arms for retaining said belt in a loop in conjunction with said motor pulley during the unloaded mode, said retainer arms being movable away from and out of engagement with said belt, so that when a second pulley to be driven is inserted within said loop and urged against said belt, said loop changes its configuration to engage tautly both said drive motor pulley and said second driven pulley during the loaded mode.

2. A drive coupling assembly as in claim 1, including means for moving said motor pulley for tensioning said belt during the load mode.

3. A drive coupling assembly as in claim 2, wherein said motor pulley moving means comprises a motor plate for supporting said motor pulley.

4. A drive coupling assembly as in claim 3, wherein said motor plate has a cam surface for urging said retainer arms away from said belt during the load mode, said plate acting to retain said arms away from said belt during operation of the drive coupling assembly.

5. A drive coupling assembly as in claim 2, including a load spring for returning said motor pulley to home position during the unload mode.

6. A drive coupling assembly comprising:

a drive belt;

a drive motor pulley coupled to said drive belt;

retainer arms for retaining said belt in a loop in conjunction with said motor pulley during the unloaded mode, said retainer arms being movable away from said belt, so that when a second pulley to be driven is inserted within said loop and urged against said belt, said loop changes its configuration to engage tautly both said drive motor pulley and said second driven pulley during the loaded mode, including low friction elements attached to one end of each arm for retaining said belt in a loop condition when the coupling assembly is in an unloaded mode; and gears at the other end of each arm about which said arms are pivotable.

7. A drive coupling assembly as in claim 6, wherein said low friction elements are rollers.

8. A drive coupling assembly as in claim 6, wherein said gears are connected so that said retainer arms move synchronously.

9. A drive coupling assembly as in claim 6, including a load spring coupled to one of said arms for providing a force to return the arms to an unload home position from a load position, so that said arm elements contact and retain said drive belt in a loop.

10. A method of coupling a drive pulley located in a housing to a pulley that is to be driven and which is disposed in an external recess of a module comprising the steps of:

placing the exposed pulley of the module within the perimeter of a drive belt of the housing;

moving said module and pulley away from said drive pulley engaged with the drive belt in the housing, and into contact with said drive belt;

moving retainer arms that normally hold said drive belt in a loop during non-operation of the drive coupling assembly out of contact with said drive belt; and maintaining the arms out of contact with said drive belt during operation of said drive coupling assembly.

* * * * *